United States Patent
Park et al.

(10) Patent No.: US 9,144,146 B2
(45) Date of Patent: Sep. 22, 2015

(54) HIGH VOLTAGE DRIVING DEVICE FOR X-RAY TUBE

(71) Applicant: POSKOM Co., Ltd., Paju-si, Gyeonggi-Do (KR)

(72) Inventors: Jong Lae Park, Seoul (KR); Ki Bong Sung, Goyang-si (KR)

(73) Assignee: POSKOM CO., LTD., Paju-si, Gyeonggi-Do (KR)

( * ) Notice: Subject to any disclaimer, the term of this patent is extended or adjusted under 35 U.S.C. 154(b) by 228 days.

(21) Appl. No.: 13/836,689

(22) Filed: Mar. 15, 2013

(65) Prior Publication Data

US 2014/0064455 A1 Mar. 6, 2014

(30) Foreign Application Priority Data

Sep. 5, 2012 (KR) .................. 10-2012-0098412

(51) Int. Cl.
*H02M 7/10* (2006.01)
*H05G 1/12* (2006.01)

(52) U.S. Cl.
CPC .. *H05G 1/12* (2013.01); *H02M 7/10* (2013.01)

(58) Field of Classification Search
CPC .... H01G 1/12; H02M 7/10; H02M 7/02–7/40
See application file for complete search history.

(56) References Cited

U.S. PATENT DOCUMENTS

| 3,770,963 | A | * | 11/1973 | Vandervelden et al. | ...... | 378/118 |
| 4,720,844 | A | * | 1/1988 | Bougle | ......................... | 378/101 |
| 5,023,768 | A | | 6/1991 | Collier | | |
| 2005/0226384 | A1 | * | 10/2005 | Domoto et al. | ............... | 378/125 |

FOREIGN PATENT DOCUMENTS

| JP | 07045398 A | 2/1995 |
| JP | 10189287 A | 7/1998 |
| JP | 2001045761 A | 2/2001 |
| JP | 2001052940 A | 2/2001 |

* cited by examiner

*Primary Examiner* — Glen Kao
*Assistant Examiner* — Dani Fox
(74) *Attorney, Agent, or Firm* — Lowe Hauptman & Ham, LLP

(57) ABSTRACT

The present invention relate to an X-ray photographing apparatus, and more particularly, to a high voltage driving circuit for X-ray tube, in which a first voltage multiplying rectifier unit and a second voltage multiplying rectifier unit are in series connected to each other based on a high voltage generation unit to stably convert a high voltage power generated from the high voltage generation unit into a drive power for an X-ray tube with high energy efficiency, and in which a plurality of isolation transformers or high voltage transformers is in series connected to each other in the high voltage generation unit to divide a voltage of the second voltage multiplying rectifier unit into a withstanding voltage of the isolation transformers or the high voltage transformers, thereby ensuring excellent insulation properties.

4 Claims, 5 Drawing Sheets

HIGH VOLTAGE DRIVING DEVICE FOR X-RAY TUBE

CROSS-REFERENCE TO RELATED APPLICATIONS

This application claims the benefit of Korean Patent Application No. 10-2012-0098412, filed on Sep. 5, 2012 in the Korean Intellectual Property Office, which is incorporated herein by reference in its entirety.

BACKGROUND OF THE INVENTION

1. Field of the Invention

Exemplary embodiments of the present invention relate to an X-ray photographing apparatus, and more particularly, to a high voltage driving circuit for X-ray tube, in which a first voltage multiplying rectifier unit and a second voltage multiplying rectifier unit are in series connected to each other based on a high voltage generation unit to stably convert a high voltage power generated from the high voltage generation unit into a drive power for an X-ray tube with high energy efficiency, and in which a plurality of isolation transformers or high voltage transformers is in series connected to each other in the high voltage generation unit to divide a voltage of the second voltage multiplying rectifier unit into a withstanding voltage of the isolation transformers or the high voltage transformers, thereby ensuring excellent insulation properties.

2. Description of Related Art

An industrial X-ray photographing apparatus is an apparatus in which an generated X-ray beam is transmitted to a welded portion of an iron sheet or a concrete structure to capture an X-ray image of the welded portion or the structure so that a user can check whether or not the welded portion or the structure is in an abnormal state based on the captured X-ray image.

A high voltage driving circuit for X-ray tube used in a conventional industrial X-ray photographing apparatus will be described hereinafter in further detail with reference to FIG. 1.

The high voltage driving circuit for X-ray tube includes an inverter unit 10 for receiving a supply of a commercial AC power and generating a high-frequency AC power, a high voltage generation unit 20 for receiving a supply of the high-frequency AC power generated from the inverter unit 10 through a primary coil thereof and inducing a high-voltage power corresponding to the turns ratio of the primary coil and a secondary coil thereof to the secondary coil, a voltage multiplying rectifier unit 30 for receiving a supply of the high-voltage power from the high voltage generation unit 20 and generating a rectified high-voltage power having a level needed to drive the X-ray tube 40

In this case, the voltage multiplying rectifier unit increments the high-voltage power applied thereto from the high voltage generation unit 20 by a multiple of the applied high-voltage power to generate the rectified high-voltage power.

The X-ray tube 40 includes an X-ray tube housing 41 that is internally maintained in a vacuum state, a cathode 43 and an anode 45 that are disposed so as to be opposed to each other within the X-ray tube housing 41, and an cathode filament 47 connected at one end thereof to the cathode 43 so as to be opposed to the anode 45 within the X-ray tube housing 41. In this case, the anode 45 is grounded. The voltage multiplying rectifier unit 30 supplies the rectified high-voltage power generated therefrom to the cathode 43 and the cathode filament 47 connected at one end thereof to the cathode 43, and the filament driving power supply unit 50 supplies a drive power to the cathode filament 47.

A filament current generated by the drive power supplied to the cathode filament 47 heats the cathode filament 47 to generate thermal electrons, which in turn collide with the anode 45 by a voltage difference between the anode 45 and the cathode filament 47 to generate an X-ray beam.

FIG. 2 is a circuit diagram illustrating a voltage multiplying rectifier unit of a conventional high voltage driving circuit for X-ray tube.

Referring to FIG. 2, when a high frequency power (NP) is applied to the primary coil of the high voltage generation unit 20, the high voltage generation unit 20 increases a level of the high frequency power (NP) to a level corresponding to the turns ratio of the primary coil and the secondary coil thereof to cause a high-voltage power (NS) to be induced to the secondary coil.

The voltage multiplying rectifier unit 30 includes a plurality of unit voltage multiplying circuits (30-1, 30-2, 30-3, ..., 30-N), which are connected in series. Each time the high-voltage power (NS) sequentially flows through the respective unit voltage multiplying circuits (30-1, 30-2, 30-3, ..., 30-N), the high-voltage power (NS) applied to each of the unit voltage multiplying circuits (30-1, 30-2, 30-3, ..., 30-N) is rectified into a high-voltage power that is incremented by a multiple of the applied high-voltage power (NS) by the voltage multiplying rectifier unit 30, and then is outputted. The voltage multiplying rectifier unit 30 generates a rectified high-voltage power having a level enough to allow an X-ray beam to be generated from the X-ray tube 40 through the plurality of the unit voltage multiplying circuits (30-1, 30-2, 30-3, ..., 30-N) that is cascaded.

However, in order to generate the rectified high-voltage power having a level enough to allow an X-ray beam to be generated from the X-ray tube 40, it is required that the voltage multiplying rectifier unit 30 should include a plurality of unit voltage multiplying circuits. In addition, the more the number of the unit voltage multiplying circuits, the lower the energy transfer efficiency and the higher the ripple voltage, which makes it difficult to include an infinitely increased number of the unit voltage multiplying circuits. Further, it is required that the more the number of the unit voltage multiplying circuits, the higher the capacity of the condenser and diode should be, which makes it impossible to manufacture the products following a trend toward thinness and lightness. Thus, there occurs a problem in that a high voltage driving circuit for an X-ray tube 40 cannot not be manufactured in an inexpensive and compact manner.

SUMMARY OF THE INVENTION

Accordingly, the present invention has been made to solve the above-mentioned problems involved in the conventional the high voltage driving device for X-ray tube, and it is an object of the present invention to provide a high voltage driving device for X-ray tube, which can generate a rectified high-voltage power having a level needed by the X-ray tube while reducing the number of stages of the unit voltage multiplying circuits.

Another object of the present invention is to provide a high voltage driving device for X-ray tube, in which a first voltage multiplying rectifier unit and a second voltage multiplying rectifier unit are in series connected to each other based on a high voltage generation unit to generate a rectified high-voltage power having a level needed by the X-ray tube with high energy efficiency, and which can be manufactured in an inexpensive and compact manner Still another object of the present invention is to provide a high voltage driving device for X-ray tube, in which a high voltage generation unit consists of at least one isolation transformer and at least one high voltage transformer that are in series connected to each other to divide voltage of a second voltage multiplying rectifier unit into a withstanding voltage of the isolation transformer or the high voltage transformer, thereby being stably capable of being used stably while ensuring excellent insulation properties.

To achieve the above objects, the present invention provides a high voltage driving device for X-ray tube, including: an inverter unit for receiving a supply of a commercial AC power and converting the received commercial AC power into a high-frequency AC power; a high voltage generation unit for receiving a supply of the high-frequency AC power from the inerter unit and generating a high-voltage power; and a voltage multiplying rectifier unit comprising a first voltage multiplying rectifier unit for receiving a supply of a the high-voltage power from the high voltage generation unit and generating a first rectified high-voltage power with a level that is a multiple of the received high-voltage power, and a second voltage multiplying rectifier unit for receiving a supply of the high-voltage power from the high voltage generation unit and generating a second rectified high-voltage power with the same level as that of the first rectified high-voltage power of the first voltage multiplying rectifier unit, the second voltage multiplying rectifier unit being in series connected to the first voltage multiplying rectifier unit, wherein an output terminal of the first voltage multiplying rectifier unit is connected to a cathode terminal, and an output terminal of the second voltage multiplying rectifier unit is grounded.

In the high voltage driving device for X-ray tube according to the present invention, the high voltage generation unit may include: an isolation transformer unit for receiving a supply of the high-frequency AC power from the inerter unit through a primary coil and generating an isolated high frequency power, which is in turn induced to a secondary coil; and a high-voltage transformer unit for receiving a supply of the high-frequency AC power from the isolation transformer unit and converting the received high frequency power into the high-voltage power.

Preferably, the high voltage generation unit may include one or more isolation transformer units for receiving a supply of the high frequency power from the inverter unit through a primary coil and generating an isolated high frequency power, which is in turn induced to a secondary coil.

In the high voltage driving device for X-ray tube according to the present invention, the voltage of the second voltage multiplying rectifier unit may be divided into a withstanding voltage of the isolation transformer unit or the high-voltage transformer unit.

Preferably, the first voltage multiplying rectifier unit or the second voltage multiplying rectifier unit may be a cockcroft-walton voltage multiplying rectifier circuit.

The high voltage driving device for X-ray tube according to the present invention may further include a filament driving power supply unit for supplying a drive power to a cathode filament connected to a cathode terminal of the X-ray tube, and the filament driving power supply unit includes one or more filament transformer units for dividing the voltage of the cathode terminal of the X-ray tube, the filament transformer units being connected in series to each other.

BRIEF DESCRIPTION OF THE DRAWINGS

The above and other objects, features and advantages of the present invention will be apparent from the following detailed description of the preferred embodiments of the invention in conjunction with the accompanying drawings, in which.

Figure 1:
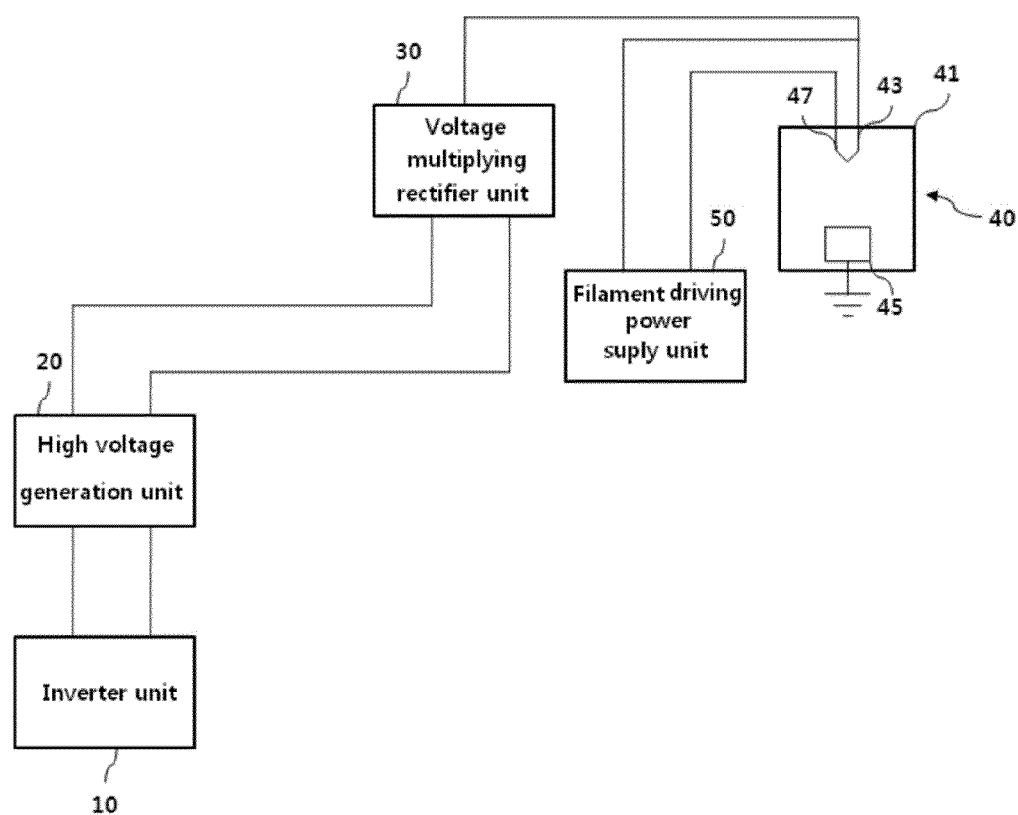
FIG. 1 is a functional block diagram illustrating the inner configuration of a high voltage driving circuit for X-ray tube used in a conventional X-ray photographing apparatus.
Figure 2:
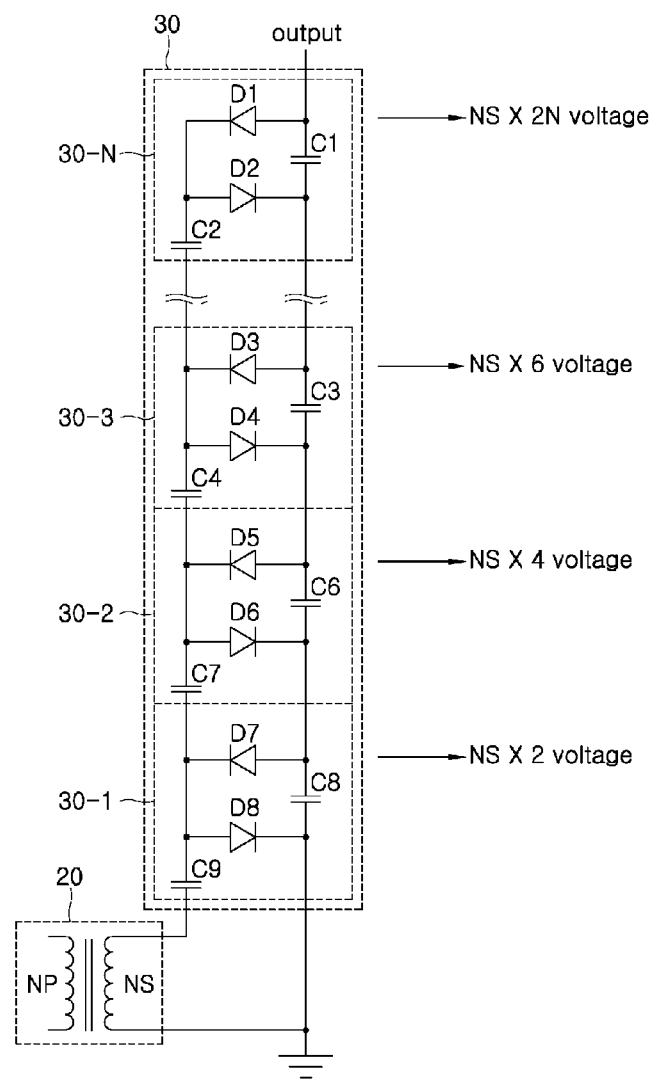
FIG. 2 is a circuit diagram illustrating a voltage multiplying rectifier unit of a conventional high voltage driving circuit for X-ray tube.

EXPLANATION ON SYMBOLS 10, 110: inverter unit
20, 120: high voltage generation unit
30: voltage multiplying rectifier unit
40, 150: X-ray tube
50: filament driving power supply unit
130: first voltage multiplying rectifier unit
140: second voltage multiplying rectifier unit
151: X-ray tube housing
153: cathode
155: anode
157: cathode filament

DESCRIPTION OF SPECIFIC EMBODIMENTS

Hereinafter, a high voltage driving device for X-ray tube according to the present invention will be described in more detail with reference to the accompanying drawings.

Figure 3:
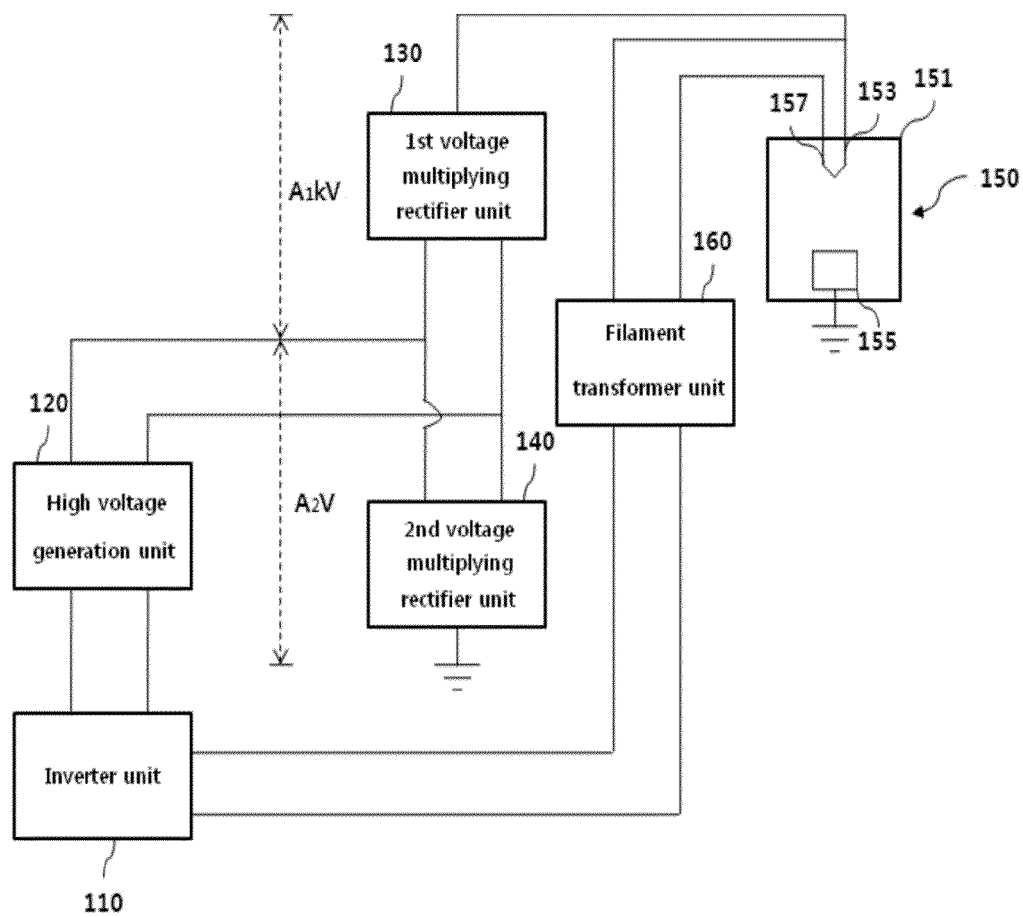
FIG. 3 is a functional block diagram illustrating the inner configuration of a high voltage driving device for X-ray tube according to the present invention.

FIG. 3 is a functional block diagram illustrating the inner configuration of a high voltage driving device for X-ray tube according to the present invention.

Referring to FIG. 3, an inverter unit 110 receives a supply of a commercial AC power and converts the received commercial AC power into a high-frequency AC power through a high-speed switching operation. A high voltage generation unit 120 receives a supply of the high-frequency AC power from the inverter unit 110 to generate a high-voltage power. A first voltage multiplying rectifier unit 130 and a second voltage multiplying rectifier unit 140 are in series connected to each other based on the high voltage generation unit 120. The first voltage multiplying rectifier unit 130 receives a supply of the high-voltage power generated from the high voltage generation unit 120 and generates a first rectified high-voltage power with a level that is a multiple of the received high-voltage power. On the other hand, the second voltage multiplying rectifier unit 140 receives a supply of the high-voltage power from the high voltage generation unit 120 and generates a second rectified high-voltage power with the same level as that of the first rectified high-voltage power generated from the first voltage multiplying rectifier unit 130 by incrementing the received high-voltage power by a multiple of the high-voltage power.

In this case, an output terminal of the second voltage multiplying rectifier unit 140 is grounded. Thus, the voltage level of an output terminal of the first voltage multiplying rectifier unit 130 is a negative power level ($-(A_1+A_2)$kV), which corresponds to the sum of a level ($A_1$kV) of the first rectified high-voltage power generated from the first voltage multiplying rectifier unit 130 an a level ($A_2$kV) of the second rectified high-voltage power generated from the second voltage multiplying rectifier unit 140

The output terminal of the first voltage multiplying rectifier unit 130 is connected to the X-ray tube 150, and the first voltage multiplying rectifier unit 130 provides power with a level needed to allow the X-ray tube 150 to generate an X-ray beam. The X-ray tube 150 includes an X-ray tube housing 151, a cathode 153 and an anode 155 that are disposed so as to be opposed to each other within the X-ray tube housing 151, and an cathode filament 157 connected at one end thereof to the cathode 153 so as to be opposed to the anode 155 within the X-ray tube housing 151. In this case, the anode 155 is grounded.

The rectified high-voltage power generated from the first voltage multiplying rectifier unit 130 is supplied to the cathode 153 and the cathode filament 157. At this time, the filament transformer unit 160 receives a supply of the high-frequency AC power from the inverter unit 110 and generates a drive power for driving the cathode filament 157 for application to the cathode filament 157. The filament current supplied to the cathode filament 157 heats the cathode filament 157 to generate thermal electrons, which in turn collide with the anode 155 due to a voltage difference between the anode 155 and the cathode filament 157 to generate an X-ray beam.

The high voltage generation unit 120 will be again described hereinafter with reference to the above-mentioned description.

The high voltage generation unit 120 consists of at least one isolation transformer and at least one high voltage transformer, which are in series connected to each other. The isolation transformer receives a supply of the high-frequency AC power from the inverter unit 110 through a primary coil and generates an electrically isolated, transformed power through a secondary coil. The high voltage transformer receives a supply of the transformed power from the isolation transformer through a primary coil and generates a high-voltage power with a level increased to a level corresponding to the turns ratio between a primary coil and a secondary coil through the secondary coil.

In the high voltage driving device for X-ray tube according to the present invention, the high voltage generation unit 120 includes at least one isolation transformer and at least one high voltage transformer, which are in series connected to each other, so that voltage of the second voltage multiplying rectifier unit 140 is divided into a withstanding voltage of the isolation transformer or the high voltage transformer. In the present invention, the voltage of the second voltage multiplying rectifier unit 140 may be divided into a withstanding voltages of a difference number of the isolation transformers or the high voltage transformers depending on a voltage level of the second voltage multiplying rectifier unit 140. In addition, in the present invention, the voltage of the second voltage multiplying rectifier unit 140 may be divided into voltages of a difference number of the isolation transformers or the high voltage transformers depending on the level of the withstanding voltage of the isolation transformer or the high voltage transformer. In the present invention, the voltage of the high voltage generation unit 120 can be divided into a withstanding voltage of at least one isolation transformer and at least one high voltage transformer, which are in series connected to each other, so that high insulation properties can be maintained to allow a high-voltage drive power supply for X-ray tube to be manufactured safely.

In the meantime, more specifically, the filament transformer unit 160 consists of one or more isolation transformers, which are in series connected to each other. The filament transformer unit 160 receives a supply of the high-frequency AC power form the inverter unit 110 through a primary coil and generates an electrically isolated drive power through a secondary coil. The cathode filament 157 is connected to a terminal of the cathode 153, which is in turn connected to the output terminal of the first voltage multiplying rectifier unit 130 having a very high negative voltage. The filament transformer unit 160 divides the very high negative voltage of the cathode terminal into withstanding voltages of one or more isolation transformers, which are in series connected to each other, so that high insulation properties can be maintained to allow a drive power supply of the cathode filament to be manufactured safely.

Figure 4:
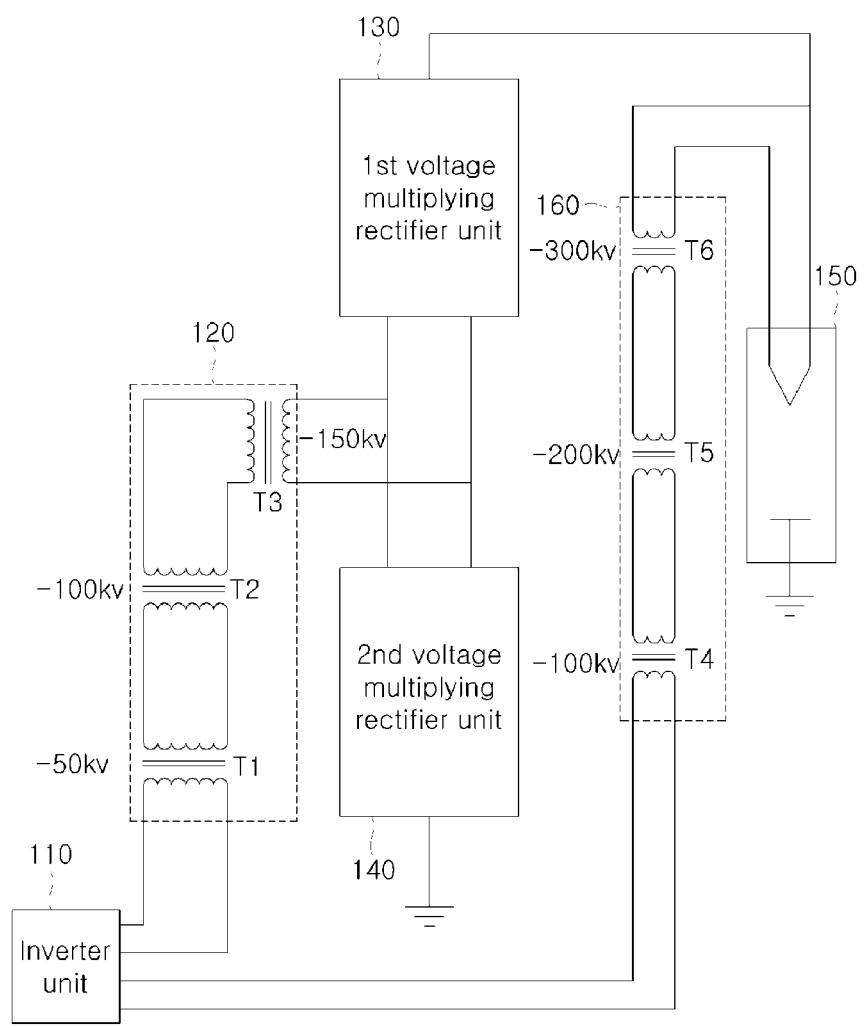
FIG. 4 is a block diagram illustrating a high voltage generation unit 120 and a filament transformer unit 160 of a high voltage driving device for X-ray tube according to the present invention.

FIG. 4 is a block diagram illustrating the high voltage generation unit 120 and the filament transformer unit 160 of a high voltage driving device for X-ray tube according to the present invention.

The high voltage generation unit 120 and the filament transformer unit 160 will be described hereinafter in further detail with reference to FIG. 4.

The high voltage generation unit 120 includes two isolation transformers T1 and T2, and one high voltage transformer T3. The first isolation transformer T1 is connected to the inverter unit 110 to receive a supply of the high frequency AC power from the inverter unit 110 through a primary coil. The high frequency power applied to the primary coil of the first isolation transformer T1 is converted into a magnetic field, and then is induced to a secondary coil of the first isolation transformer T1 to generate a primary electrically isolated, transformed power. On the other hand, the second isolation transformer T2 is in series connected to the first isolation transformer T1, and receives a supply of the primary transformed power from the first isolation transformer T1 through the primary coil. The primary transformed power applied to the primary coil of the second isolation transformer T2 is converted into a magnetic field, and then is induced to a secondary coil of the second isolation transformer T2 to generate a secondary electrically isolated, transformed power. In addition, the third isolation transformer T3 is in series connected to the second isolation transformer T2, and receives a supply of the secondary transformed power from the second isolation transformer T2 through a primary coil. The secondary transformed power applied to the primary coil of the third isolation transformer T3 is converted into a high-voltage power corresponding to the turns ratio between the primary coil and a secondary coil of the third isolation transformer T3 through the secondary coil of the third isolation transformer T3.

The high voltage driving device for X-ray tube according to the present invention is configured such that the first voltage multiplying rectifier unit 130 and the second voltage multiplying rectifier unit 140 are in series connected to each other based on the high voltage generation unit 120, and the output terminal of the second voltage multiplying rectifier unit 140 is grounded. Thus, the voltage of the second voltage multiplying rectifier unit 140 is divided into withstanding voltages of the first isolation transformer T1, the second isolation transformer T2, and the high voltage transformer T3, which constitute the high voltage generation unit 120, by −50 kV, respectively. Thus, the high voltage generation unit 120 can supply an electrically isolated, stable high voltage power to the first voltage multiplying rectifier unit 130 and the second voltage multiplying rectifier unit 140.

In the meantime, the filament transformer unit 160 includes three isolation transformers T4, T5, and T6. The third isolation transformer T4 is connected to the inverter unit 110 and receives a supply of a filament driving power from the inverter unit 110 through a primary coil. The filament driving power applied to the primary coil of the third isolation transformer T4 is converted into a magnetic field, and then induced to a secondary coil of the third isolation transformer T4 to generate a primary electrically isolated, filament transformed power. In the meantime, the fourth isolation transformer T5 is in series connected to the third isolation transformer T4, and receives a supply of the primary filament transformed power from the third isolation transformer T4 through a primary coil. The primary filament transformed power applied to the primary coil of the fourth isolation transformer T5 is converted into a magnetic field, and then induced to a secondary coil of the fourth isolation transformer T5 to generate a secondary electrically isolated, filament transformed power. In addition, the fifth isolation transformer T6 is in series connected to the fourth isolation transformer T5, and receives a supply of the secondary filament transformed power from the fourth isolation transformer T5 through a primary coil. The secondary filament transformed power applied to the primary coil of the fifth isolation transformer T6 is induced to a secondary coil of the fifth isolation transformer T6 to generate a tertiary electrically isolated, filament transformed power. Preferably, at least one of the third to fifth isolation transformers T3, T4, and T5 has a different turns ratio between the primary coil and the secondary coil, and thus the power induced to the secondary coil is converted into a power with a level smaller than that of the power applied to the primary coil.

In the high voltage driving device for X-ray tube according to the present invention, the filament has a very high negative voltage since it is short-circuited to the cathode terminal connected to the output terminal of the first voltage multiplying rectifier unit 130. The very high negative voltage of the first voltage multiplying rectifier unit 130 is divided into withstanding voltages of the third isolation transformer T4, the fourth isolation transformer T5, and the fifth isolation transformer T6, which are in series connected to each other to constitute the filament transformer unit 160, by 100 kV, respectively. Thus, the filament transformer unit 160 can provide an electrically isolated, stable filament driving power to the cathode filament of the X-ray tube 150.

Figure 5:
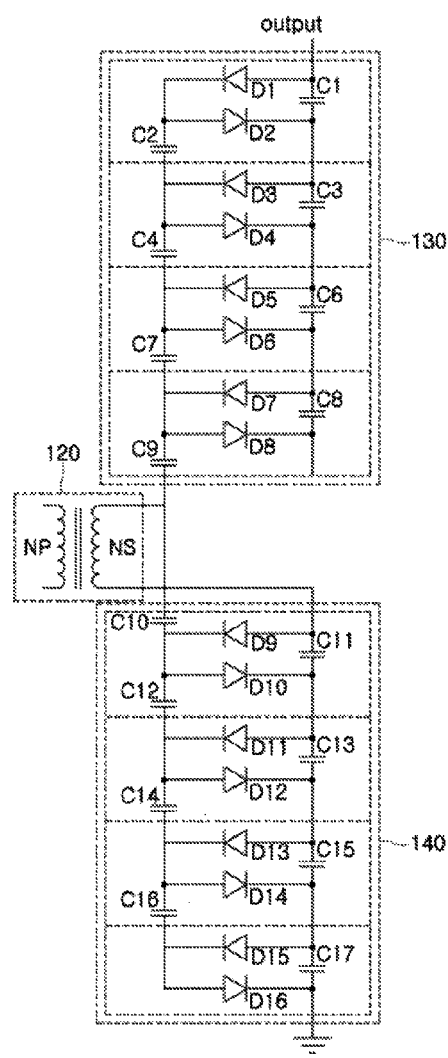
FIG. 5 is a circuit diagram illustrating an example of a first voltage multiplying rectifier unit and a second voltage multiplying rectifier unit that are used in a high voltage driving device for X-ray tube according to the present invention.

FIG. 5 is a circuit diagram illustrating an example of the first voltage multiplying rectifier unit and the second voltage multiplying rectifier unit that are used in a high voltage driving device for X-ray tube according to the present invention.

The example of the first voltage multiplying rectifier unit and the second voltage multiplying rectifier unit will be described hereinafter in further detail with reference to FIG. 5.

The first voltage multiplying rectifier unit 130 and the second voltage multiplying rectifier unit 140 are in series connected to each other based on the high voltage generation unit 120. The first voltage multiplying rectifier unit 130 includes four unit voltage multiplying circuits, and converts the high-voltage power applied thereto from the high voltage generation unit 120 into a power with a level that is a multiple of the high-voltage power applied to each of the four unit voltage multiplying circuits, and outputs a rectified high-voltage power with a level that is eight times higher than that of the high-voltage power applied thereto from the output terminal of the high voltage generation unit 120.

Meanwhile, the second voltage multiplying rectifier unit 140 includes four unit voltage multiplying circuits, and converts the high-voltage power applied thereto from the high voltage generation unit 120 into a power with a level that is a multiple of the high-voltage power applied to each of the four unit voltage multiplying circuits, and outputs a rectified high-voltage power with a level that is eight times higher than that the high-voltage power applied thereto from the output terminal of the high voltage generation unit 120. Then, the output terminal of the second voltage multiplying rectifier unit 140 is grounded, and thus a negative high voltage is produced from the output terminal of the first voltage multiplying rectifier unit 130.

The high voltage driving device for X-ray tube according to the present invention is configured such that the first voltage multiplying rectifier unit 130 and the second voltage multiplying rectifier unit 140 are in series connected to each other to form a two-stage structure based on the high voltage generation unit 120, and the output terminal of the second voltage multiplying rectifier unit 140 is grounded, so that the first voltage multiplying rectifier unit 130 can generate a rectified high-voltage power with a level needed for the X-ray tube with a high energy efficiency. In addition, the voltage multiplying rectifier unit is configured as a two-stage structure so that a high voltage driving device for X-ray tube can be manufactured in an inexpensive and compact manner using a low capacity condenser or diode.

As described above, the high voltage driving device for X-ray tube according to the present invention has the following various effects.

First, the first voltage multiplying rectifier unit and the second voltage multiplying rectifier unit are in series connected to each other to form a two-stage structure based on the high voltage generation unit, so that a rectified high-voltage power with a level needed for the X-ray tube can generated while reducing the number of the unit voltage multiplying circuits constituting the first voltage multiplying rectifier unit or the second voltage multiplying rectifier unit.

Second, the first voltage multiplying rectifier unit and the second voltage multiplying rectifier unit are in series connected to each other based on the high voltage generation unit, so that a rectified high-voltage power with a level needed for the X-ray tube can be generated with a high energy efficiency, and a high voltage driving device for X-ray tube can be manufactured in an inexpensive and lightweight manner. That is, the voltage multiplying rectifier unit is separated into the first voltage multiplying rectifier unit and the second voltage multiplying rectifier unit, so that each of the first voltage multiplying rectifier unit and the second voltage multiplying rectifier unit can generate only a drive power with a level that is half as much as that of the entire drive power needed for the X-ray tube, thereby improving voltage multiplication efficiency using a small number of the unit voltage multiplying circuits.

Third, the high voltage generation unit consists of at least one isolation transformer and at least one high voltage transformer so that the voltage of the voltage multiplying rectifier unit can be divided into withstanding voltages of a plurality of isolation transformers or high voltage transformers to maintain high insulation properties.

Fourth, the filament transformer unit consists of one or more isolation transformers, which are in series connected to each other, so that a voltage of the cathode terminal of the X-ray tube can be divided into withstanding voltage of the isolation transformers maintain high insulation properties.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A high voltage driving device for X-ray tube, the device comprising:
    an inverter unit configured to
        receive a supply of an AC power, and
        convert the received AC power into a high-frequency AC power;
    a high voltage generation unit configured to
        receive a supply of the high-frequency AC power from the inverter unit, and
        generate a high-voltage power; and
    a voltage multiplying rectifier unit comprising:
        a first voltage multiplying rectifier unit configured to
            receive a supply of the high-voltage power from the high voltage generation unit, and
            generate a first rectified high-voltage power with a level that is a multiple of the received high-voltage power; and
        a second voltage multiplying rectifier unit configured to
            receive a supply of the high-voltage power from the high voltage generation unit, and
            generate a second rectified high-voltage power with the same level as that of the first rectified high-voltage power of the first voltage multiplying rectifier unit,
    wherein the second voltage multiplying rectifier unit is in series connected to the first voltage multiplying rectifier unit,
    wherein an output terminal of the first voltage multiplying rectifier unit is connected to a cathode terminal, and an output terminal of the second voltage multiplying rectifier unit is grounded,
    wherein the high voltage generation unit comprises:
        at least one isolation transformer configured to generate an isolated high frequency power; and
        at least one high voltage transformer configured to
            receive a supply of the high-frequency power from the isolation transformer unit, and
            generate the high-voltage power,
    wherein the at least one isolation transformer and the at least one high voltage transformer are in series connected to each other, and
    wherein the voltage of the second voltage multiplying rectifier unit is divided into a withstanding voltage of the isolation transformer unit and the high-voltage transformer unit.

2. The high voltage driving device for X-ray tube according to claim 1, wherein the first voltage multiplying rectifier unit or the second voltage multiplying rectifier unit is a cockcroft-walton voltage multiplying rectifier circuit.

3. The high voltage driving device for X-ray tube according to claim 1, further comprising a filament driving power supply unit configured to supply a drive power to a cathode filament connected to a cathode terminal of the X-ray tube,
    wherein the filament driving power supply unit comprises a plurality of filament transformer units configured to divide the voltage of the cathode terminal of the X-ray tube, the filament transformer units being connected in series to each other.

4. The high voltage driving device for X-ray tube according to claim 1,
    wherein the first voltage multiplying rectifier unit is configured to generate the first rectified high-voltage power with a level ($A_1$kV),
    wherein the second voltage multiplying rectifier unit is configured to generate the second rectified high-voltage power with a level ($A_2$kV), and
    wherein the output terminal of the first voltage multiplying rectifier unit is configured to be applied with a negative power level ($-(A_1+A_2)$kV).

* * * * *